(12) United States Patent
Przybylski et al.

(10) Patent No.: US 9,049,561 B2
(45) Date of Patent: Jun. 2, 2015

(54) SYSTEM AND METHOD FOR DISTRIBUTING TRACK INFORMATION IN A CONSIST

(71) Applicant: Electro-Motive Diesel, Inc., LaGrange, IL (US)

(72) Inventors: Lawrence Stanley Przybylski, Lemont, IL (US); Tom Otsubo, Oak Grove, MO (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 211 days.

(21) Appl. No.: 13/711,235

(22) Filed: Dec. 11, 2012

(65) Prior Publication Data

US 2014/0162562 A1    Jun. 12, 2014

(51) Int. Cl.
*H04B 1/034* (2006.01)
*H04W 4/04* (2009.01)
*H04W 4/20* (2009.01)

(52) U.S. Cl.
CPC .............. *H04W 4/04* (2013.01); *H04W 4/046* (2013.01); *H04W 4/20* (2013.01)

(58) Field of Classification Search
CPC ............................ H04W 4/046; B61L 23/00
USPC ........... 455/96, 66.1, 575.9, 95, 99, 344, 345
See application file for complete search history.

(56) References Cited

U.S. PATENT DOCUMENTS

| 3,696,758 | A | 10/1972 | Godinez, Jr. |
| 4,042,810 | A | 8/1977 | Mosher |
| 4,181,943 | A | 1/1980 | Mercer, Sr. et al. |
| 4,401,035 | A | 8/1983 | Spigarelli et al. |
| 5,969,643 | A | 10/1999 | Curtis |
| 6,862,502 | B2 | 3/2005 | Peltz et al. |
| 7,021,589 | B2 | 4/2006 | Hess, Jr. et al. |
| 7,072,747 | B2 | 7/2006 | Armbruster et al. |
| 7,073,753 | B2 | 7/2006 | Root et al. |
| 7,263,475 | B2 | 8/2007 | Hawthorne et al. |
| 7,548,032 | B2 | 6/2009 | Alton, Jr. et al. |
| 7,949,441 | B2 | 5/2011 | Baig et al. |
| 2005/0121971 | A1 | 6/2005 | Ring |
| 2011/0270475 | A1 | 11/2011 | Brand et al. |
| 2011/0282525 | A1 | 11/2011 | Kraeling et al. |

*Primary Examiner* — Eugene Yun
(74) *Attorney, Agent, or Firm* — Finnegan, Henderson, Farabow, Garrett & Dunner, LLP

(57) ABSTRACT

A system for communicating track information within a consist having at least a first and second locomotive may include a first transceiver associated with the first locomotive and configured to receive the track information from a remote transceiver. The system may include a communication link connecting the first locomotive with the second locomotive and a communication controller associated with the first locomotive. The communication controller may be configured to identify a lead locomotive and send a signal to the lead locomotive indicating that the track information is fully received from the remote transceiver. The communication controller may be configured to, if the lead locomotive is a locomotive other than the first locomotive, send the track information to the lead locomotive via the communication link, and if the lead locomotive is the first locomotive, send at least a portion of the track information to the second locomotive via the communication link.

20 Claims, 3 Drawing Sheets

SYSTEM AND METHOD FOR DISTRIBUTING TRACK INFORMATION IN A CONSIST

TECHNICAL FIELD

This disclosure relates generally to a data communication network and, more specifically, to a system and method for distributing track information in a consist.

BACKGROUND

In trains, such as those using communication-based train control (CBTC) systems, track information, such as, for example, track maps, temporary slow orders, and track speed limits, may be downloaded from remote transceivers, such as those located at rail yards. This process may occur when the train is stationary. For some trains, track information may be downloaded to multiple locomotives. This may result in additional delay of the departure time, since it stresses the communication bandwidth at the rail yard, which may have a single server to service the CBTC data dissemination.

One system for transmitting track information to a train is disclosed in U.S. Pat. No. 4,181,943 ("the '943 patent"). The '943 patent discloses a speed and location programmer located at a particular train station used to prepare a non-volatile program that may be used by an onboard microcomputer to control the speed of a train. The program includes train orders, track conditions, and other relevant information, such as size, length, and capacity of the train, which may be obtained from a centralized location. The program is fed into a microcomputer, which monitors the speed and distance of the train and compares it with the program. According to the '943 patent, if the parameters contained in the program are exceeded, either the throttle is reduced or the brakes are applied to regulate the speed of the train. A trip history of the train may be extracted at the next train station to determine the operation of the train by the engineer. The system of the '943 patent uses an operator's console to activate and update the system.

The system provided by the '943 patent may suffer from a number of possible drawbacks. For example, the '943 patent relies on an assumption that only one locomotive will control the train. However, it may be desirable to control the train using different locomotives based on changing conditions and train configurations. As a result, it is desirable for more than one locomotive to have access to track information. Furthermore, the locomotive in the '943 patent must receive the downloaded information from a remote station, which may be impracticable under certain circumstances.

The presently disclosed systems and methods are directed to overcoming and/or mitigating one or more of the possible drawbacks set forth above and/or other problems in the art.

SUMMARY

According to one aspect, this disclosure is directed to a system for communicating track information within a consist having at least a first locomotive and a second locomotive. The system may include at least a first transceiver associated with the first locomotive and configured to receive the track information from a remote transceiver. The system may also include a communication link connecting the first locomotive with at least the second locomotive. The system may also include a communication controller associated with the first locomotive. The communication controller may be configured to identify a lead locomotive of the consist and send a signal to the lead locomotive indicating that the track information is received from the remote transceiver. The communication controller may also be configured to, if the lead locomotive is a locomotive other than the first locomotive, send the track information to the lead locomotive via the communication link. The communication controller may also be configured to, if the lead locomotive is the first locomotive, send at least a portion of the track information to the second locomotive via the communication link.

According to another aspect, this disclosure is directed to a computer-implemented method for communication track information within a consist. The method may include identifying a lead locomotive of the consist and receiving the track information at a first locomotive from a remote source. The method may also include notifying a processor associated with the lead locomotive that the track information has been received. The method may also include communicating at least a portion of the track information from the first locomotive to at least a second locomotive in the consist, wherein at least one of the first locomotive and the second locomotive comprises the lead locomotive.

According to yet another aspect, this disclosure is directed to a consist that may include at least a first locomotive and a second locomotive. The consist may include a first transceiver associated with the first locomotive and configured to receive track information from a remote transceiver. The consist may also include a communication link connecting the first locomotive to the second locomotive. The consist may include a communication controller associated with the first locomotive. The communication controller may be configured to identify a lead locomotive of the consist and send a signal to the lead locomotive indicating that the track information is received from the remote transceiver. The communication controller may also be configured to, if the lead locomotive is a locomotive other than the first locomotive, send the track information to the lead locomotive via the communication link. The communication controller may also be configured to, if the lead locomotive is the first locomotive, send the track information to the second locomotive via the communication link.

DETAILED DESCRIPTION

Figure 1:
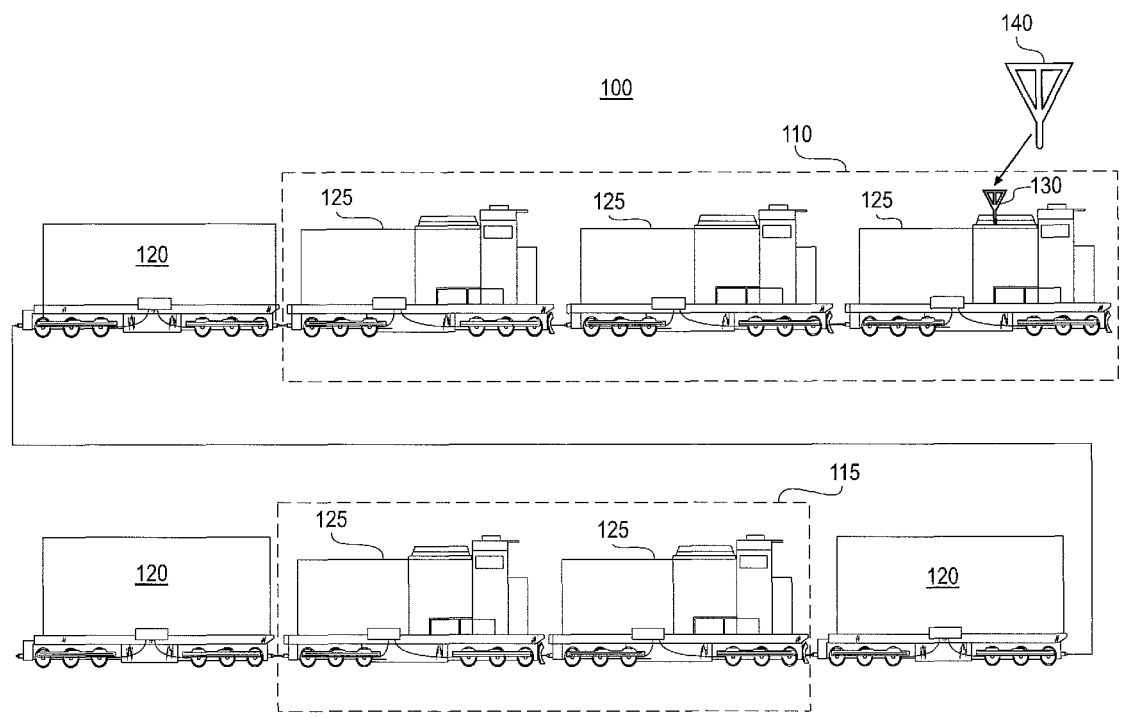
FIG. 1 is a side view of an exemplary embodiment of a train.

FIG. 1 shows an exemplary train 100 in which systems and methods for communicating track information may be implemented consistent with the disclosed exemplary embodiments. Train 100 may include a leading consist 110. Optionally, train 100 may include one or more trailing consists 115. Train 100 may also include one or more railcars 120. Each consist, including leading consist 110 and trailing consist 115, may include one or more adjacent locomotives 125 that are communicatively linked to one another. For example, locomotives 125 in leading consist 110 may be configured to communicate wirelessly and/or over multiple-unit train control (MU) cables or other appropriate cabling communication methods. According to the exemplary embodiment illustrated in FIG. 1, leading consist 110 may include a wireless transceiver 130 configured to communicate with a remote transceiver 140 that is separate from train 100. Transceiver 130 may receive track information from remote transceiver 140. Track information may include, for example, one or more of track maps, temporary slow orders, and track speed limits.

Figure 2:
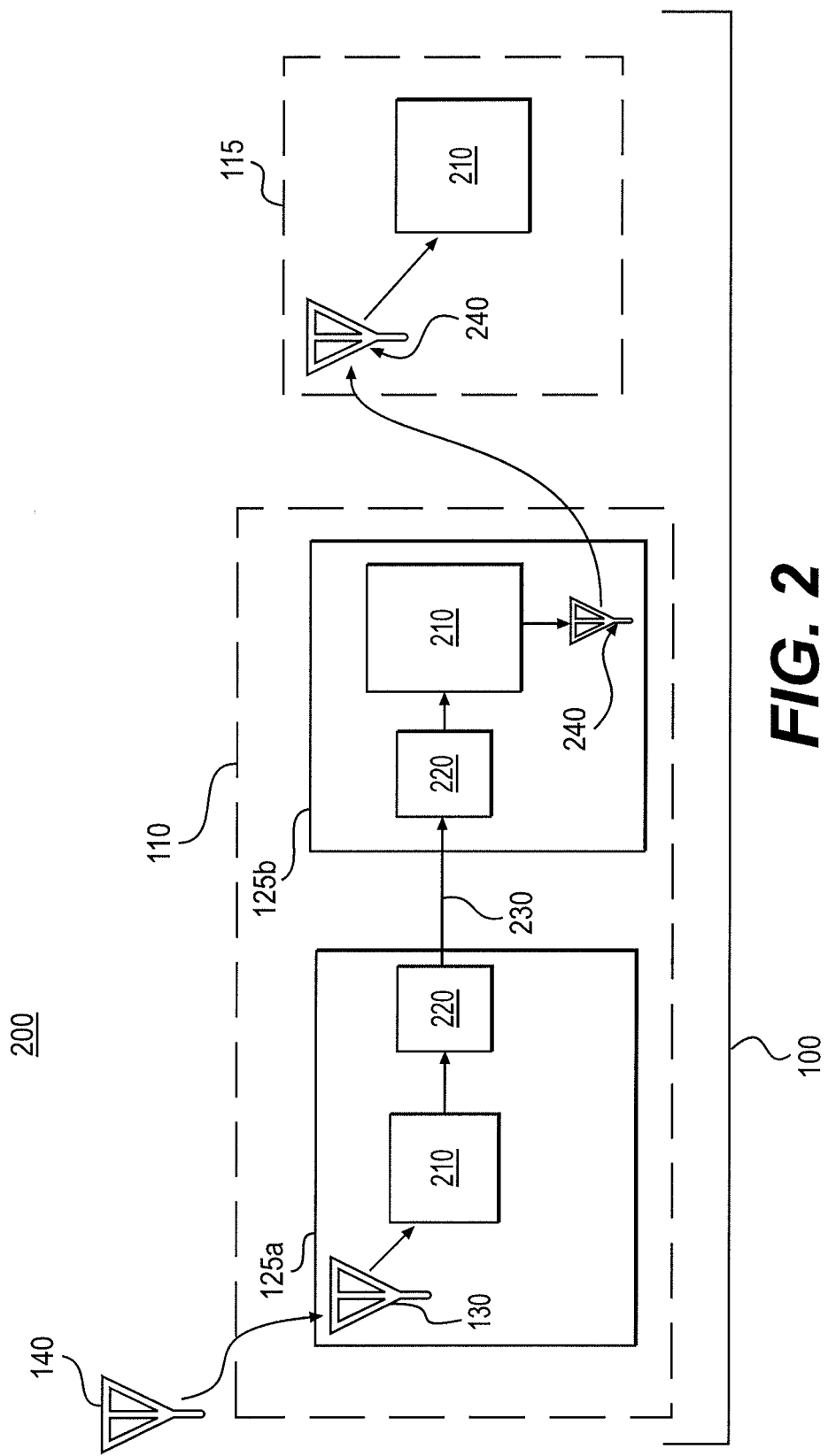
FIG. 2 is a schematic diagram of an exemplary embodiment of a system for communicating track information between locomotives in a consist and between consists in a train.

FIG. 2 shows an exemplary embodiment of a system 200 for communicating track information within consist 110. In addition, system 200 includes an optional feature for communicating track information between consist 110 and trailing consist 115 in train 100.

System 200 may include one or more communication controllers 210 (e.g., a microprocessor) to control sharing of track information between locomotives 125 in consist 110 and/or trailing consist 115. According to the embodiment shown in FIG. 2, system 200 may include a communication controller 210 associated with first locomotive 125a. According to some embodiments, first locomotive 125a may not be the foremost front locomotive 125 of train 100. Communication controller 210 may embody a single processor or multiple processors that include a means for identifying a lead locomotive of locomotives 125 and communicating at least a portion of track information with one or more locomotives 125 in consist 110, including the lead locomotive of locomotives 125. Additionally or alternatively, communication controller 210 may control communication with remote consist 115.

Additionally or alternatively, communication controller 210 may comprise a portion or all of system 200. Numerous commercially available processors can be configured to perform the functions of communication controller 210. It should be appreciated that communication controller 210 could readily embody a general machine or customized processor capable of controlling the operation of system 200. Communication controller 210 may include all components required to run an application, such as, for example, a memory, a secondary storage device, and a processor, such as a central processing unit or other known means. Various other known circuits may be associated with communication controller 210, including power source circuitry (not shown) and other appropriate circuitry. An exemplary configuration of communication controller 210 is described below with respect to FIG. 3.

As shown in FIG. 2, system 200 may also include one or more secondary transceivers 220 configured to communicate track information between locomotives 125 in consist 110. For example, some embodiments may include one or more secondary transceivers 220 associated with each locomotive 125 that are capable of communicating with one or more secondary transceivers 220 associated with an adjacent locomotive. Two secondary transceivers 220 may be configured to communicate signals via one or more communication line 230. According to some embodiments, communication line 230 may be implemented with one or more of a digital subscribing line (DSL) or Ethernet, or other equivalent cabling technology. According to some embodiments, first locomotive 125a may include a single transceiver system that embodies both transceiver 130 that communicate with remote transceiver 140 and secondary transceiver 220 to communicate with other locomotives 125. For example, secondary transceiver 220 associated with second locomotive 125b may be configured to communicate with at least one of transceiver 130 and secondary transceiver 220 associated with first locomotive 125a.

According to some embodiments, secondary transceiver 220 associated with second locomotive 125b may communicate wirelessly. For example, secondary transceiver 220 may communicate with at least one of transceiver 130 and secondary transceiver 220 associated with first locomotive 125a at a first frequency that is different than the second frequency at which transceiver 130 communicates with remote transceiver 140.

System 200 may also include one or more wireless transceivers 240. Each wireless transceiver 240 may be associated with at least one consist 110 and may be configured to communicate track information with other wireless transceivers 240 associated with other consists. According to some embodiments, wireless transceivers 240 may communicate at a different frequency than transceiver 130 communicates with remote transceiver 140. According to some embodiments, secondary transceiver 220 and wireless transceiver 240 associated with the same locomotive 125 may be embodied in a single transceiver subsystem.

Figure 3:
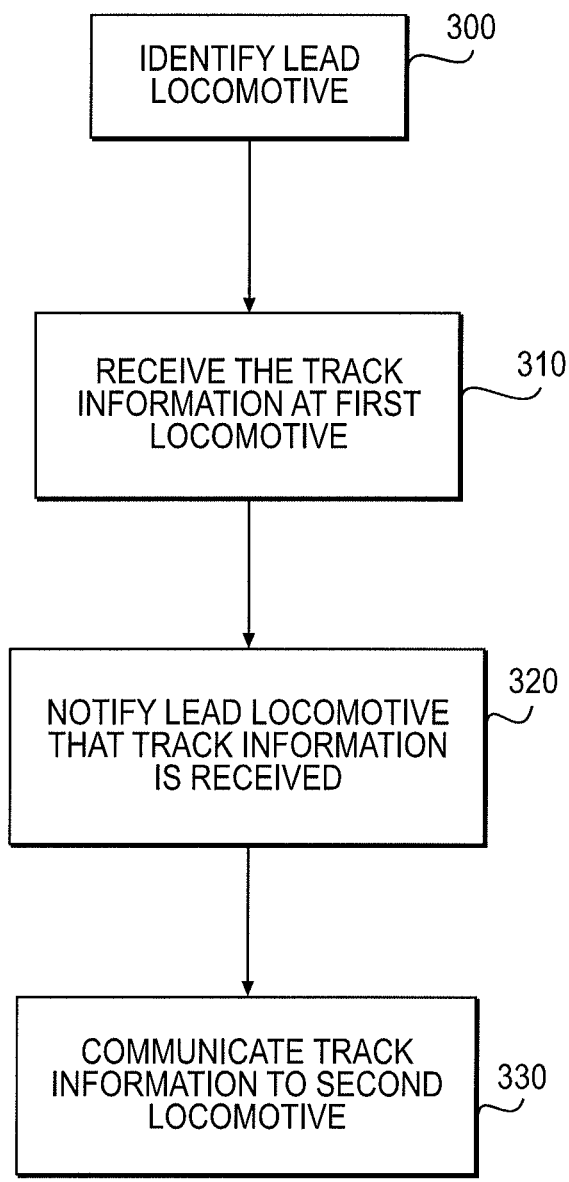
FIG. 3 is a flowchart of an exemplary embodiment of a method for communicating track information in a consist.

FIG. 3 is a flow chart of an exemplary embodiment of a computer-implemented method for communicating track information in a consist. At step 300, communication controller 210 may identify the lead locomotive of leading consist 110. During travel, the lead locomotive may issue commands to other locomotives in train 100 or leading consist 110 and/or may provide some level of control over the operation of train 100 (e.g., speed control, braking, etc.). The lead locomotive may be part of consist 110, but it is not necessarily the front foremost locomotive 125. Furthermore, the identity of lead locomotive may change. According to some embodiments, the role of lead locomotive may be transferred to another locomotive 125 in consist 110 or train 100. For example, if it is determined that one or more control subsystems of the lead locomotive is malfunctioning, another locomotive 125 may assume control of train 100, thereby becoming the new lead locomotive. As the lead locomotive directs the behavior of train 100, it is useful to identify which locomotive 125 may use track information.

At step 310, communication controller 210 may receive the track information from remote transceiver 140 at the first locomotive. According to some embodiments, the lead locomotive may receive the track information (e.g., when the first locomotive is the lead locomotive). For example, train 100 may remain at a rail yard operating remote transceiver 140. Thus, at step 320, communication controller 210 may notify a processor (not shown) associated with the lead locomotive that the track information has been received. According to some embodiments, communication controller 210 may be located at the lead locomotive. According to some embodiments, communication controller 210 may be remote from the lead locomotive and may send at least a portion of the track information to the lead locomotive.

To ensure that during operation at least one functioning locomotive 125 has access to the track information, at step 330, communication controller 210 may direct that at least a portion of the track information be sent to at least a second locomotive 125b. According to some embodiments, communication controller 210 may direct the track information to be sent via communication line 230. According to some embodiments in which lead locomotive is not the first locomotive 125a associated with communication controller 210, the track information may be sent to locomotive 125 that communication controller 210 has identified as the lead locomotive. For example, all of the track information may be sent to the lead locomotive 230. According to some embodiments, if the lead locomotive is the first locomotive, the critical portion of the track information may be send to the second locomotive without waiting for a request from the second locomotive.

According to some embodiments, track information may include both critical and noncritical data, and communication controller 210 may be configured to isolate critical from noncritical data. Separating critical data from noncritical data may be useful in circumstances in which communication between locomotives 125 may be less reliable, or in which other data may be communicated at a higher priority than noncritical data. Data may be critical if it relates to information used at the beginning of the projected route of the train. For example, speed limits within the first half of a trip may be considered critical data. Additionally or alternatively, critical data may be a minimum amount of data that train 100 may need to travel to the next stopping point on its route. Noncritical data may include any other data, including more detailed data on, for example, track conditions. According to some embodiments in which the lead locomotive is first locomotive 125a, communication controller 210 may communicate only a critical portion of the track information to second locomotive 125b. In such embodiments, second locomotive 125b may communicate a request to communication controller 210 to receive the remainder of the track information. In response to a request from second locomotive 125b, communication controller 210 may send the noncritical portion of the track information.

According to some embodiments, communication controller 210 may receive a track information update from a remote source. For example, communication controller 210 may be configured to receive wireless updates over a cellular network, and a track information update may include a change in track conditions, like, for example, track maintenance or an obstruction on the track. Communication controller 210 may be configured to communicate the track update to second locomotive 125b via the communication link 230. Additionally or alternatively, communication controller 210 may be configured to update a track information database associated with leading consist 110 according to the track information update.

As the identity of the lead locomotive in consist 110 may change, communication controller 210 may also be configured to respond to such a change. For example, communication controller 210 may be configured to determine that the identity of the lead locomotive has changed. This may be accomplished, according to some embodiments, by receiving a signal from the new lead locomotive indicative of the change. Communication controller 210 may also be configured to determine if the new lead locomotive already has received the track information. This may be accomplished by having variables that can be read by communication controller 210 that are indicative of which locomotives 125 of consist 110 have received track information by communication controller 210. Additionally or alternatively, this may be accomplished by receiving a signal from the new lead locomotive requesting the track information. If communication controller 210 determines that the new lead locomotive does not have the track information, communication controller 210 may send the track information to the new lead locomotive.

According to some embodiments, communication controller 210 may be configured to determine how many locomotives 125 are in consist 110. For example, communication controller 210 may be configured to determine that consist 110 contains a third locomotive 125. If communication controller 210 identifies a third locomotive in consist 110 and the new lead locomotive is one of first or second locomotives, communication controller 210 may be configured to send at least a portion of the track information to the third locomotive. This may be done, for example, if the former lead locomotive has given control to the new lead locomotive because of some functional issues, such that providing the track information to third locomotive may ensure two operational locomotives have the track information at all times. Additionally or alternatively, communication controller 210 may command second locomotive 125b to send track information to the third locomotive. In this manner, communication controller 210 may direct sharing of track information among the trains in a manner that is suited for the particular arrangement of consist 110.

INDUSTRIAL APPLICABILITY

The disclosed system and method may provide a robust solution for communicating track information between locomotives in a consist and between consists in a train. The presently disclosed systems and methods may have several advantages. For example, this system provides a flexible system that can accommodate a train and/or consist in which more than one locomotive may operate as the lead locomotive during the same trip. The presently disclosed systems and methods may provide for transmitting track information to a new lead locomotive. This information can be also be shared between consists in the same train for other purposes.

Additionally, track information can be shared among different locomotives without requiring that all locomotives obtain track information directly from the remote source. This will decrease the bandwidth usage of the locomotive at the remote source. Also, as only one locomotive may need to obtain track information directly from the remote source, the download time at the remote source may be decreased, as the train does not need to wait for each locomotive to receive the information before leaving the rail yard. Instead, locomotives in the same train or consist may share track information among each other, even while the train is in transit.

It will be apparent to those skilled in the art that various modifications and variations may be made to the disclosed systems for communicating track information between locomotives in a consist and between consists in a train. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

What is claimed is:

1. A system for communicating track information within a consist having at least a first locomotive and a second locomotive, the system comprising:
    at least a first transceiver associated with the first locomotive and configured to receive the track information from a remote transceiver;
    a communication link connecting the first locomotive with at least the second locomotive;
    a communication controller associated with the first locomotive and configured to:
        identify a lead locomotive of the consist;
        send a signal to the lead locomotive indicating that the track information is received from the remote transceiver;
        if the lead locomotive is a locomotive other than the first locomotive, send the track information to the lead locomotive via the communication link; and
        if the lead locomotive is the first locomotive, send at least a portion of the track information to the second locomotive via the communication link.

2. The system of claim 1, wherein the communication link includes a second transceiver associated with the second locomotive, the second transceiver is configured to communicate with at least one of the first transceiver or a third transceiver associated with the first locomotive.

3. The system of claim 2, wherein the second transceiver and at least one of the first or third transceiver are configured to communicate wirelessly at a first frequency different than a second frequency at which the first transceiver communicates with the remote transceiver.

4. The system of claim 2, wherein the second transceiver and at least one of the first or third transceiver are configured to communicate via a communication line.

5. The system of claim 1, wherein the communication controller is further configured to:
   if the lead locomotive is the first locomotive, send a critical portion of the track information to the second locomotive without waiting for a request from the second locomotive; and
   in response to a request from the second locomotive, send a noncritical portion of the track information.

6. The system of claim 1, wherein the communication controller is further configured to:
   receive a track information update from a remote location; and
   send the track information update to the second locomotive via the communication link.

7. A computer-implemented method for communicating track information within a consist, the method comprising:
   identifying a lead locomotive of the consist;
   receiving the track information at a first locomotive of the consist from a remote source;
   notifying a processor associated with the lead locomotive that the track information has been received; and
   communicating at least a portion of the track information from the first locomotive to at least a second locomotive in the consist,
   wherein at least one of the first locomotive and the second locomotive comprises the lead locomotive.

8. The method of claim 7, further including:
   determining that the identity of the lead locomotive has changed, resulting in a new lead locomotive;
   determining whether the new lead locomotive has received the track information; and
   if the new lead locomotive has not received the track information, sending the track information to the new lead locomotive.

9. The method of claim 8, further including:
   determining whether the consist includes a third locomotive; and
   if the new lead locomotive is one of the first and second locomotives, sending the track information to the third locomotive.

10. The method of claim 8, further including:
    determining whether the consist includes a third locomotive; and
    commanding the second locomotive to send the track information to the third locomotive.

11. The method of claim 7, further including:
    receiving a signal indicative of a track information update at the first locomotive;
    updating a track information database associated with the consist according to the track information update; and
    sending the track information update to the second locomotive.

12. The method of claim 7, wherein, if the lead locomotive is the second locomotive, communicating at least a portion of the track information includes communicating all of the track information to the second locomotive.

13. The method of claim 7, wherein, if the lead locomotive is the first locomotive, communicating at least a portion of the track information includes communicating a critical portion of the track information.

14. The method of claim 13, further including:
    receiving a request from the second locomotive for additional track information; and
    sending a noncritical portion of the track information to the second locomotive.

15. A consist comprising:
    at least a first locomotive and a second locomotive;
    a first transceiver associated with the first locomotive and configured to receive track information from a remote transceiver;
    a communication link connecting the first locomotive to the second locomotive;
    a communication controller associated with the first locomotive and configured to:
      identify a lead locomotive of the consist;
      send a signal to the lead locomotive indicating that the track information is received from the remote transceiver;
      if the lead locomotive is a locomotive other than the first locomotive, send the track information to the lead locomotive via the communication link; and
      if the lead locomotive is the first locomotive, send at least a portion of the track information to the second locomotive via the communication link.

16. The consist of claim 15, further including a second transceiver associated with the second locomotive that is configured to communicate with the first transceiver or a third transceiver associated with the first locomotive.

17. The consist of claim 16, wherein the second transceiver and at least one of the first or third transceiver are configured to communicate wirelessly at a first frequency that is different than a second frequency at which the first transceiver communicates with the remote transceiver.

18. The consist of claim 16, wherein the second transceiver and at least one of the first or third transceiver are configured to communicate through a communication line.

19. The consist of claim 15, wherein the communication controller is further configured to:
    if the lead locomotive is the first locomotive, send a critical portion of the track information to the second locomotive without waiting for a request from the second locomotive; and
    in response to a request from the second locomotive, send a noncritical portion of the track information.

20. The consist of claim 15, wherein the communication controller is further configured to:
    receive a track information update from a remote location; and
    send the track information update to the second locomotive via the communication link.

* * * * *